Patented June 14, 1932

1,862,786

UNITED STATES PATENT OFFICE

HUGH ALBERT EDWARD DRESCHER, WILLIAM SMITH, AND JOHN THOMAS, OF GRANGE-MOUTH, SCOTLAND, ASSIGNORS TO SCOTTISH DYES, LIMITED, OF GRANGEMOUTH, SCOTLAND

PRODUCTION OF ANTHRAQUINONE DERIVATIVES

No Drawing. Original application filed July 20, 1926, Serial No. 123,792. Divided and this application filed December 20, 1927, Serial No. 241,450, and in Great Britain July 21, 1925.

This invention which is a division of application No. 123,792 filed on July 20th, 1926, relates to the preparation of anthraquinone derivatives.

It has for its object to provide improved or modified processes for the production of such derivatives and also to provide a new derivative.

The invention consists in the separation of brominated-chlor-amino-anthraquinones obtained by brominating the mixture of chlor $\alpha$-amino and chlor $\beta$-amino anthraquinones produced from (3'-amino-4'-chlor)-2-benzoyl-benzoic acid.

The invention includes generally the separation of halogenated mixtures of chlor or brom $\alpha$ and $\beta$-amino anthraquinones prepared from (3'-amino-4'-halogen)-2-benzoyl-benzoic acids.

The invention also consists in processes substantially as set forth below including both processes for the manufacture of anthraquinone derivatives and processes for using these derivatives.

The following examples illustrate how the invention may be carried into effect, references to parts being references to parts by weight:

Example 1

This deals with a method of separating the mixture of brominated-chlor-amino-anthraquinones obtained by brominating the mixture of chlor $\alpha$-amino and chlor $\beta$-amino-anthraquinones produced from (3'-amino-4'-chlor)-2-benzoyl-benzoic acid.

10 parts of mixed brom-chlor-amino-anthraquinones are dissolved in 100 parts of 96% sulphuric acid. After solution is complete, 20 parts of water are slowly added and the mixture is kept at 80° C. for 1/4 hour.

It is then cooled to 30° C., filtered and washed with 80% sulphuric acid, and finally the cake is washed with water until free from acid. There is thus obtained a bright orange coloured brom-amino-anthraquinone which may be regarded as 1-brom-2-amino-3-chlor anthraquinone.

The filtrates are then drowned in water and a product which we regard as the 1-amino-2-chlor-4-brom anthraquinone is obtained.

Example 2

This deals with the purification of the product obtained from the acid filtrates of Example 1.

The aforesaid 1-amino-2-chlor-4-brom-anthraquinone of Example 1 can be readily purified either by crystallizing from weak sulphuric acid or from organic solvents.

The purified product melts at 219° C. and dissolves in sulphuric acid to a golden yellow solution. It is a dark brick red coloured body.

Example 3

This deals with the application of the separation process of Example 1 to chlor derivatives; in a manner similar to that indicated in Example 1 dichlorinated bodies can be separated.

If the two isomers are dissolved in about 15 times their weight of sulphuric acid and the acid then diluted to 80% strength, practically pure dichlor-$\beta$-amino anthraquinone separates out as a sulphate and this we regard "a) as the 1.3-dichlor-2-amino-isomer.

Example 4

This is a modification of the sulphuric acid process of separation indicated in Examples 1 to 3.

According to this example separation of isomeric bodies as indicated above can be effected with solvents other than sulphuric acid, for example, by treatment with concentrated hydrochloric acid a product can be obtained which contains substantially less $\alpha$-amino-isomer than is present in the original mixture of 1-amino-2-chlor-and 2-amino-3-chlor anthraquinone.

Example 5

This is a modification of Example 4.

According to this example the bodies are separated by the use of organic solvents.

Nitrobenzene and tetra-chlor ethane, for instance, we regard as particularly useful for separating the brominated amino-chlor anthraquinones formed on brominating the product obtained by ring closing of (3'-amino-4'-chlor)-2-benzoyl-benzoic acid.

In the case of chloroform and chlor-benzene, several crystallizations should be used in order to get the β-amino body separated from the α-amino body. Similarly solvent naphtha, acetic acid, ethyl phthalate, butyl alcohol, glycerine and acetone can be used.

The α-amino body is usually more soluble in organic solvents than the β-amino body.

*Example 7*

This deals with the preparation and separation of other brom derivatives.

When brom-benzene is condensed with phthalic anhydride in the usual way, the product obtained—p-brom-benzoyl-benzoic acid—can be nitrated and reduced to the (3'-amino-4'-brom)-2-benzoyl-benzoic acid. This product on ring closing in the usual way appears to give a mixture of two isomeric bodies which are apparently the 1-amino-2-brom-anthraquinone and the 2-amino-3-brom anthraquinone.

Having now described our invention, what we claim as new and desire to secure by Letters Patent is:—

1. The process which consists in dissolving the mixture obtained by halogenating the mixture of amino-halogen-anthraquinones resulting from the ring closure of 3'-amino-4'-halogen-2-benzoyl benzoic acid in sulphuric acid of strength greater than 80% adding water to reduce the strength of the acid to about 80% and separating the precipitate thus formed.

2. The process which consists in dissolving one part of the mixture obtained by halogenating the mixture of amino-halogen-anthraquinones resulting from the ring closure of 3'-amino-4'-halogen-2-benzoyl benzoic acid in 10 parts of sulphuric acid of strength greater than 80% adding water to reduce the strength of the acid to about 80% and separating the precipitate thus formed.

In testimony whereof we have signed our names to this specification.

HUGH ALBERT EDWARD DRESCHER.
WILLIAM SMITH.
JOHN THOMAS.